United States Patent
Kanoh et al.

[11] Patent Number: 5,812,641
[45] Date of Patent: Sep. 22, 1998

[54] METHOD OF RENTING PORTABLE-TYPE COMMUNICATING DEVICES

[75] Inventors: Chiyuki Kanoh; Futaba Komatsu; Masanori Itoh, all of Nagano-ken, Japan

[73] Assignee: Nippon T.M.I. Co., Ltd., Nagano-ken, Japan

[21] Appl. No.: 548,070

[22] Filed: Oct. 25, 1995

[30] Foreign Application Priority Data

Oct. 28, 1994 [JP] Japan .................................. 6-288955
Nov. 24, 1994 [JP] Japan .................................. 6-289848

[51] Int. Cl.$^6$ .................................................. H04M 11/00
[52] U.S. Cl. ........................ 379/91.02; 455/409; 379/114
[58] Field of Search ................................. 379/91, 55–66, 379/112, 114, 130, 132, 144, 55.1, 91.01, 91.02; 455/33.1, 33.2, 409, 405, 406, 407, 408

[56] References Cited

U.S. PATENT DOCUMENTS

| | | | |
|---|---|---|---|
| 4,951,308 | 8/1990 | Bishop et al. ............................. | 379/91 |
| 5,054,053 | 10/1991 | Sakanishi et al. ........................ | 379/58 |
| 5,138,650 | 8/1992 | Stahl et al. ............................... | 379/91 |
| 5,325,418 | 6/1994 | McGregor et al. ....................... | 379/91 |

OTHER PUBLICATIONS

Sony CM–H333 "Portable Cellular Telephone with accessories" Operating Instrucions manual, pp. 14, 15, 46, 4, ©1993.

*Primary Examiner*—Wing F. Chan
*Attorney, Agent, or Firm*—Burns, Doane, Swecker & Mathis LLP

[57] ABSTRACT

A method of renting portable telephones is disclosed. When a portable telephone 5 is rented from a first rental shop 4-1 and returned to a second rental shop 4-2 different from the first, the telephone identification code 5(ID) and the first rental shop identification code 4-1(ID) stored therein are read and transmitted to a control center 2. Simultaneously, the number of call units 52A recorded in the portable telephone 5 is also read and transmitted to the control center 2. Based on this return data 20, the control center 2 is able to track the movement of the portable telephones 5 among the rental shops 4 (4-1, 4-2, . . . ) and to enter the use charge in the accounts as sales of the first rental shop 4-1. In addition, it can also ascertain the number of portable telephones 5 available for rental and the number of portable telephones 5 on loan at each rental shop. As a result, the renting and returning of the portable telephones among the rental shops 4 can be conducted efficiently.

10 Claims, 6 Drawing Sheets

METHOD OF RENTING PORTABLE-TYPE COMMUNICATING DEVICES

BACKGROUND OF THE INVENTION

1. Field of the Invention

This invention relates to a method of renting portable communication devices. More particularly, this invention relates to a method used among multiple rental shops to rent out portable communication devices and accept return of the rented portable communication devices after use.

This invention further relates to a rental-type portable telephone suitable for use in the method of renting portable communication devices.

2. Prior Art Description

Portable telephones, personal handy phones (PHPs) and other types of portable communication terminals and the like (referred to generally in this specification as "portable communication devices") have come into extensive use in recent years. The utilization of portable telephones has become particularly wide and this has led to the offering of portable telephone rental services.

Currently available portable telephone rental services operate on the same principle as the rental systems used for video cassette tapes, compact disks (CDs) and the like. Specifically, the customer rents a portable telephone by going to rental shop, presenting personal identification and making a security deposit. On returning the phone, he or she pays a use charge based on the increase in the number of call units recorded in a call unit recording means built into the portable telephone, and gets a deposit refund.

However, since customers frequently use portable telephones when are they on business trips or otherwise on the move, the conventional rental system requiring them to drop off the phone at the same place that it was picked up is often inconvenient.

Moreover, in cases where the customer does rent a portable telephone from one shop and return it to another, the charge for the use of the portable telephone is ordinarily treated as sales of the shop that rented out the phone. This complicates the accounting for handling the sales between the different shops at which the phone was picked up and dropped off. For example, the settlement of accounts between the rental shops as regards the use charge is complicated by the fact that the security deposit is received by the shop making the rental but is refunded by the shop which accepts the return.

The circumstances are the same in the case of the rental of portable communication devices other than portable telephones.

This invention was accomplished in the light of the foregoing problems and has as its object to provide a method of renting portable communication devices which enables the rental and return of portable telephones and other portable communication devices to be conducted freely among multiple rental shops and which also simplifies bookkeeping related to sales and the like at the individual rental shops.

Another object of the invention is to provide a rental-type portable telephone which is suitable for use in a rental method enabling portable telephones to be freely rented and returned among multiple rental shops.

SUMMARY OF THE INVENTION

For overcoming the aforesaid problems, this invention enables portable communication device rental and return operations at multiple rental shops which rent out and accept return of portable communication devices to be administered at a control center via communication lines, utilizes the identification code and call unit recording means provided in commonly used portable communication devices, assigns each rental shop an identification code by which it can be distinguished, enables rental and return of portable communication devices among the multiple rental shops based on the two types of identification codes and the data recorded in the call unit recording means, and further enables the processing of a breakdown of individual rental shop sales to be conducted with high efficiency.

More specifically, a first aspect of this invention provides a method of renting portable communication devices which utilizes multiple rental shops for renting out and accepting return of portable communication devices, at least one control center connected with the individual rental shops via communication lines, and rental portable communication devices each assigned an identification code and provided with a call unit recording means for recording a number of call units, and which enables a portable communication device rented at one rental shop to be returned after use to the same or any other rental shop, the method comprising the steps of:

assigning each rental shop an identification code and equipping each portable communication device with a rewritable memory means for storing at least the identification code of a rental shop, concurrently with renting a portable communication device at a first rental shop among the rental shops, transmitting to the control center as rental data the identification code of the rented portable communication device, the identification code of the rental shop and the number of call units recorded in the call unit recording means of the rented portable communication device at time of rental, storing the rental data received from the first rental shop in a rental data memory means at the control center, concurrently with accepting return of the rented portable communication device at a second rental shop among the rental shops including the first rental shop, reading as return data the identification code of the portable communication device, the identification code of the first rental shop stored in the rewritable memory means thereof and the number of call units recorded in the call unit recording means thereof and transmitting the return data to the control center, generating sales data related to use charge at the control center based on the return data received from the second rental shop and the rental data received from the first rental shop and stored in the rental memory means, storing the sales data in a sales data memory means for storing first rental shop sales data and transmitting the sales data to the second rental shop, and at the second rental shop, billing for the use charge based on the data related to use charge received from the control center and rewriting the identification code of the first rental shop stored in the returned portable communication device to the identification code of the second rental shop.

The method makes it possible to organize control centers and multiple rental shops controlled thereby into a network with a multilevel hierarchical structure. For example, a two-level hierarchical structure can be organized by establishing a head control center connected by communication lines with a number of control centers of the aforesaid type which independently control different groups rental shops.

The most typical portable communication device is the portable telephone.

In the method according to this invention, when a portable communication device is rented from a first rental shop and returned to a second rental shop different from the first, the communication device identification code and the first rental shop identification code stored therein are read and transmitted to the control center. Simultaneously, the number of call units recorded in the portable communication device is also read and transmitted to the control center. Based on this return data, the control center is able to track the movement of the portable communication device between the rental shops and to enter the use charge in the accounts as sales of the first rental shop. In addition, it can also ascertain the number of portable communication devices available for rental and the number of portable communication devices on loan at each rental shop. As a result, the renting and returning of the portable communication devices among the rental shops can be conducted efficiently.

Another aspect of this invention provides a rental-type portable telephone suitable for use in the aforesaid method. The rental-type portable telephone according to this invention comprises a call unit recording means for recording a number of call units, a telephone identification code memory section for storing a telephone identification code assigned to the rental-type portable telephone, a rental shop identification code memory section for rewritably storing a rental shop identification code assigned in advance to the rental shop which rented the rental-type portable telephone, a telephone identification read terminal for reading the rental shop identification code, and a rental shop identification code read/write terminal for reading and writing the rental shop identification code.

For optimum convenience, the telephone identification code read terminal and the rental shop identification code read/write terminal are preferably installed at a location near a battery recharge plug socket located on the bottom end of the portable telephone. This arrangement makes it possible to read and write memory data at the same time as recharging the battery of the returned portable telephone with a battery recharger. These terminals can be provided as a single common terminal. For this, it suffices to configure the portable telephone so that its operating mode can be switched by a key input operation or the like.

While the owner of a portable telephone can usually recall the number his or her telephone, this is often not true of a person who uses a rental-type portable telephone. To make it easy for the user to inform other parties of the phone number of the rental-type portable telephone, therefore, it is preferable to print it on a number plate at an easily visible part of the telephone. Otherwise the telephone can be designed to repeat its own number through the receiver on command.

As in the case of general portable telephones, the convenience of a rental-type portable telephone can also be enhanced by incorporating various other features such as memory for abbreviated dialing capability. However, since data stored in the telephone's memory or memories by one user is a nuisance to the next user, it is preferable to incorporate a feature enabling the next user to clear all data stored or recorded by the previous user through a single operation.

DETAILED DESCRIPTION OF PREFERRED EMBODIMENTS

The invention will now be explained in detail with reference to the drawings.

Figure 1:
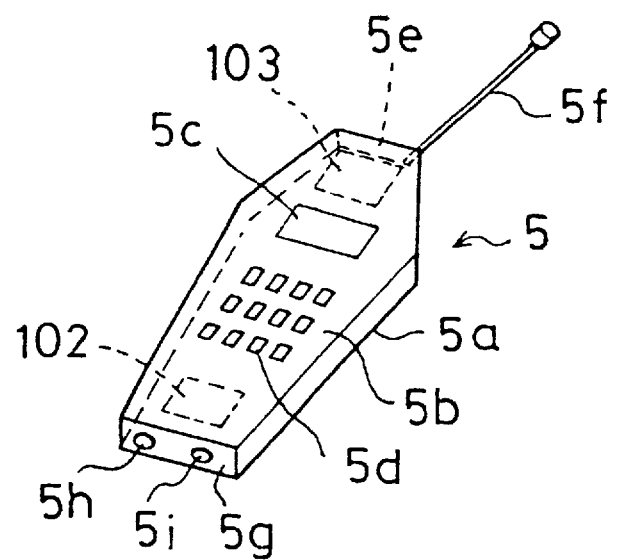
FIG. 1 is a perspective view showing a rental-type portable telephone which is an embodiment of the invention.

FIG. 1 is a perspective view showing the appearance of one example of a rental-type portable telephone suitably configured for use with the method of the invention. The rental-type portable telephone, designated by reference numeral 5, has a liquid crystal display 5c and a ten-key or other such key pad 5d on the front 5b of its oblong main unit case 5a. A telescopic antenna 5f is attached at a corner of top end 5e of the main unit case 5a. A recharge plug socket 5h for recharging an internal rechargeable (secondary) battery is provided on the bottom end 5g of the main unit case 5a. The present embodiment is further provided next to the recharge plug socket 5h with a read/write terminal 5i for read/write of various data to be described later.

Figure 2:
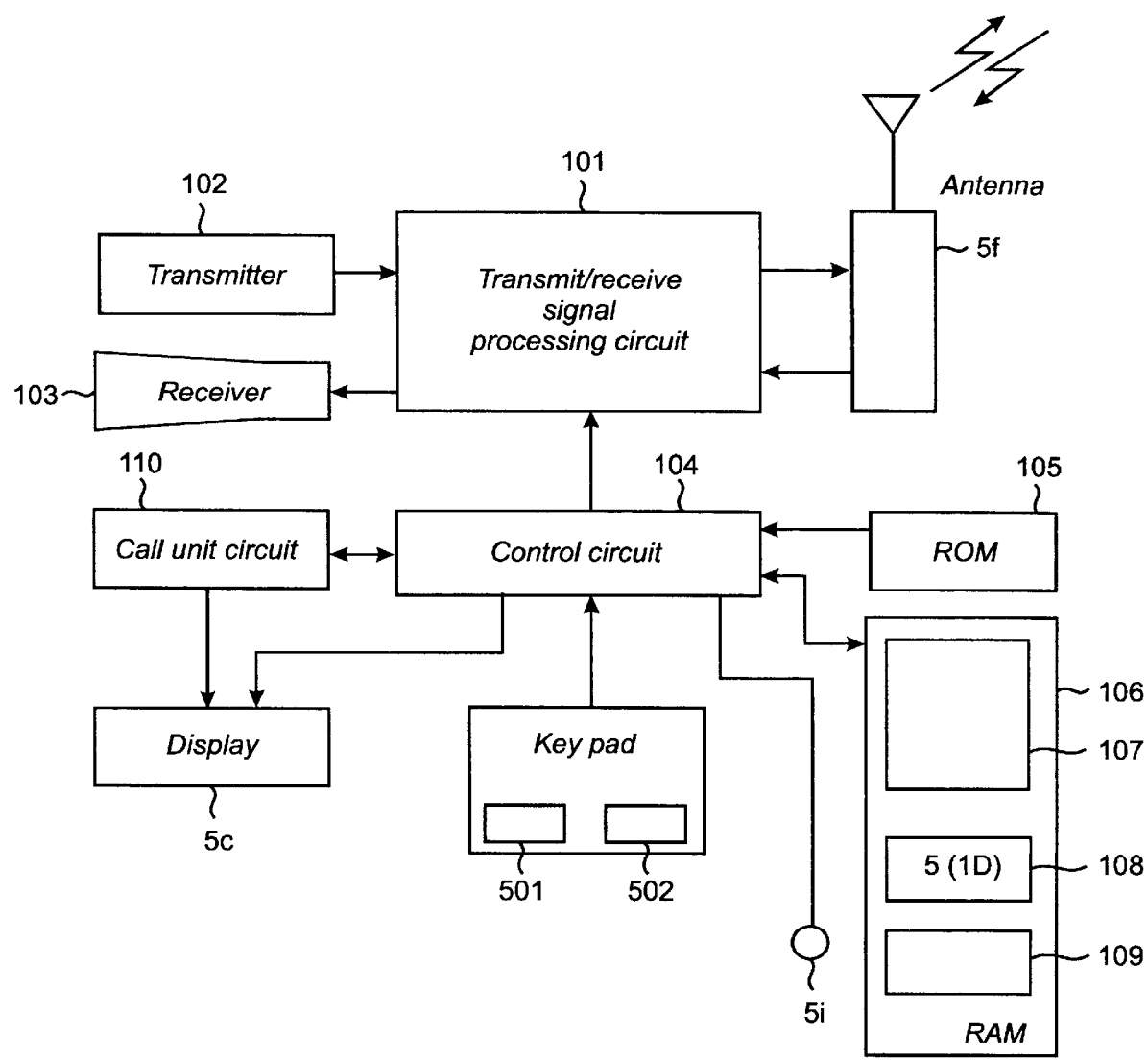
FIG. 2 is a block diagram of the control system of the portable telephone of FIG. 1.

FIG. 2 is a block diagram showing the general configuration of a control system of the rental-type portable telephone 5 of this embodiment. In this figure, reference numeral 101 designates a transmit/receive signal processing circuit. The transmit/receive signal processing circuit 101 processes voice input from a transmitter 102 for transmission from the antenna 5f and processes signals received by the antenna 5f for voice output through a receiver 103. A control circuit 104 controls the transmit/receive operations in response to input from the key pad 5d.

The control circuit 104 controls the various sections of the rental-type portable telephone 5 in accordance with a control program stored in a ROM (read-only memory) 105. A rewritable RAM (random access memory) 106 includes a rental data memory section 107 for storing rental data to be explained later and a telephone ID code memory section 108 for storing a telephone ID code 5(ID). It also includes a user memory area 109 which the user can use for storing abbreviated dialing numbers and the like.

A call unit circuit 110 calculates the accrued call time in the form of call units. The total number of call units is stored in the RAM 106. The total can also be displayed on the liquid crystal display 5c by pressing a display key 501 of the key pad 5d. The read/write terminal 5i referred to earlier in connection with FIG. 1 can be used to read data stored in different areas of the RAM 106 to the exterior. It can also be used to rewrite the contents of the RAM 106. These read and rewrite operations are executed under the control of the control circuit 104 in accordance with the operation mode selected by input from the key pad 5d. Read mode and rewrite mode operation programs are stored in the ROM 105 in advance.

The key pad 5d of this embodiment includes a clear key 502. When an input is received from the clear key 502, all data in the user memory area 109 is simultaneously cleared under the control of the control circuit 104.

An embodiment of the system for renting portable communication devices using the rental-type portable telephone 5 will now be explained.

Figure 3:
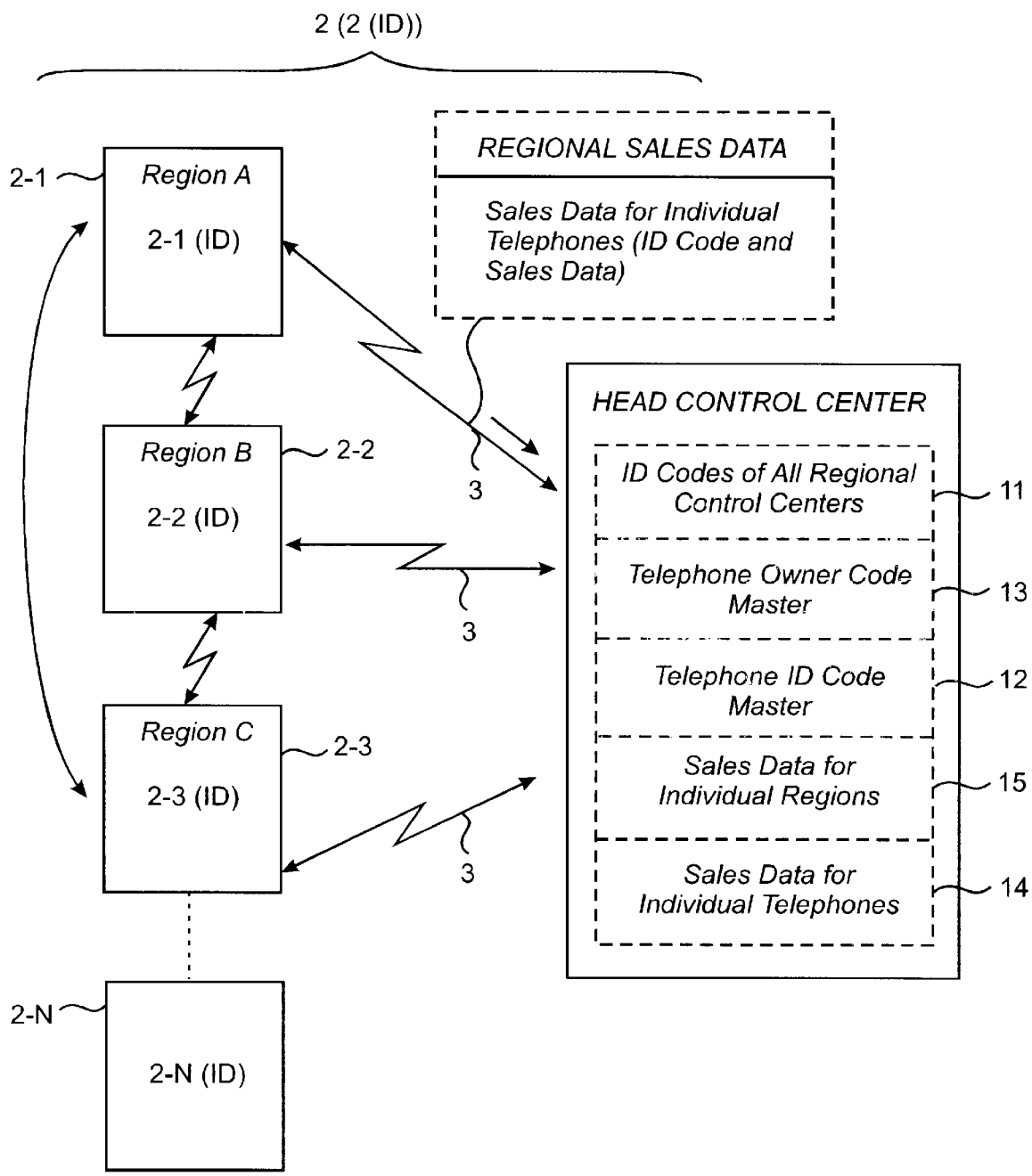
FIG. 3 is a schematic view showing the overall configuration of a system for renting portable communication devices which is an embodiment of the method of this invention.

FIG. 3 is an overview of the whole rental system network. Reference numeral 1 designates a head control center connected to multiple regional control centers 2 (2-1, 2-2, . . . 2-N) administered thereby via general communication lines 3.

Figure 4:
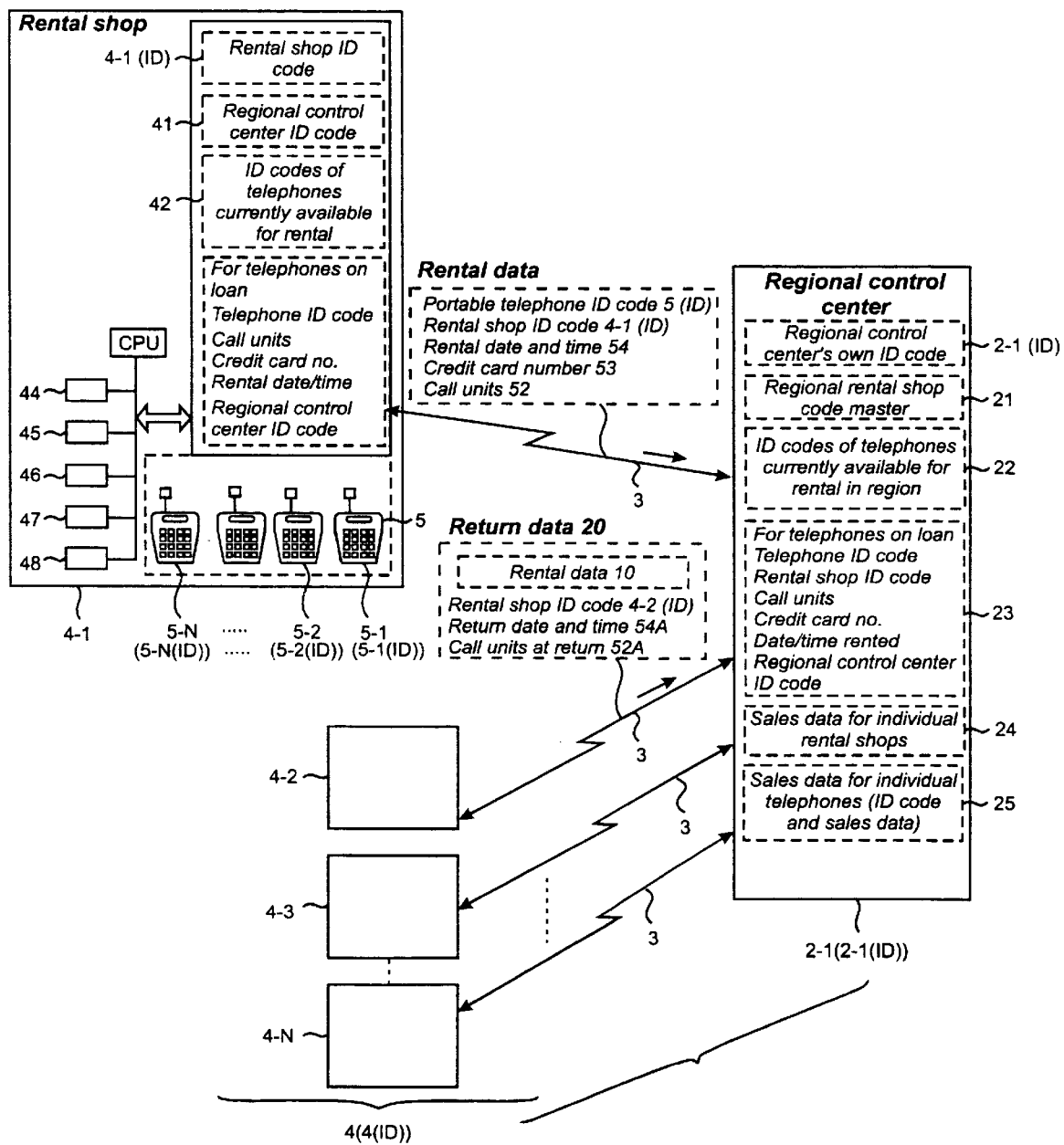
FIG. 4 is a diagram showing the network at each regional control center in the rental system of FIG. 3.

FIG. 4 shows the network centered on each of the regional control centers 2. Each regional control center 2 administers multiple rental shops 4 (4-1, 4-2, . . . 4-N). The regional control centers 2 and their rental shops 4 are also connected by general communication lines 3 through which they transmit and receive various kinds of data. Thus this embodiment is constituted as a network with a two-level hierarchical structure.

The head control center 1 in FIG. 3 has a memory area 11 for storing the ID codes 2(ID) (2-1)(ID), 2-2(ID), . . . 2-N(ID)) of the regional control centers 2, a memory area 12 for storing the ID codes 5(ID) (5-1(ID), 5-2(ID), . . . 5-N(ID)) respectively assigned in advance to the rental-type portable telephones 5 (5-1, 5-2, . . . 5-N) out on loan, and a memory area 13 for storing the names of the telephone owners. In this embodiment, the memory area 11 further includes a memory area 14 for storing sales data for the individual portable telephones and a memory area 15 for storing portable telephone use charge sales data for the individual regional control centers 2. The head control center 1 also has a transmit-receive section (not shown) for exchanging data with the regional control centers 2 via the general communication lines 3. The control, data processing and other operations of the different sections of the head control center 1 are conducted by a control system configured around a microcomputer.

As shown in FIG. 4, each regional control center 2 is assigned an ID code 2(ID) and has a memory section 21 for storing the rental shop ID codes 4(ID) assigned to the rental shops 4 under its jurisdiction. It also has a memory section 22 for storing the ID codes of the rental-type portable telephones 5 available for rental at the rental shops 4 under its jurisdiction, a rental data memory section 23 for storing data related to the rental-type portable telephones 5 out on loan, sales data memory section 24 for storing sales data for the individual rental shops, and a sales data memory section 25 for storing sales data for the individual portable telephones. The regional control center 2 also has a transmit-receive section (not shown) for exchanging data with the head control center 1 and rental shops 4. The control, data processing and other operations of the different sections of the regional control center 2 are conducted by a control system configured around a microcomputer.

Each rental shop 4 is assigned a rental shop code 4(ID) and has a memory section 41 for storing the ID code 2(ID) of the regional control center 2 whose jurisdiction it comes under and a memory section 42 for storing the ID codes of the portable telephones currently available for rental. It also has a read section 44 for reading the ID codes 5(ID) of the rental-type portable telephones 5 rented and other such data and a call unit read section 45 for reading the number of call units of the rental-type portable telephones 5 to be rented. For facilitating payment of use charges by credit card, each rental shop 4 in this embodiment is further equipped with a card reader 46 for reading data from customer credit cards. Each rental shop 4 also has a data rewrite section 47 for rewriting data once written to the memory sections of the rental-type portable telephone 5, for instance, for rewriting the ID code of the rental shop which rented the phone to the ID code of the rental shop which accepted its return. In addition, each rental shop 4 is equipped with a transmit-receive section 48 for receiving and transmitting data by use of general communication lines.

Figure 5:
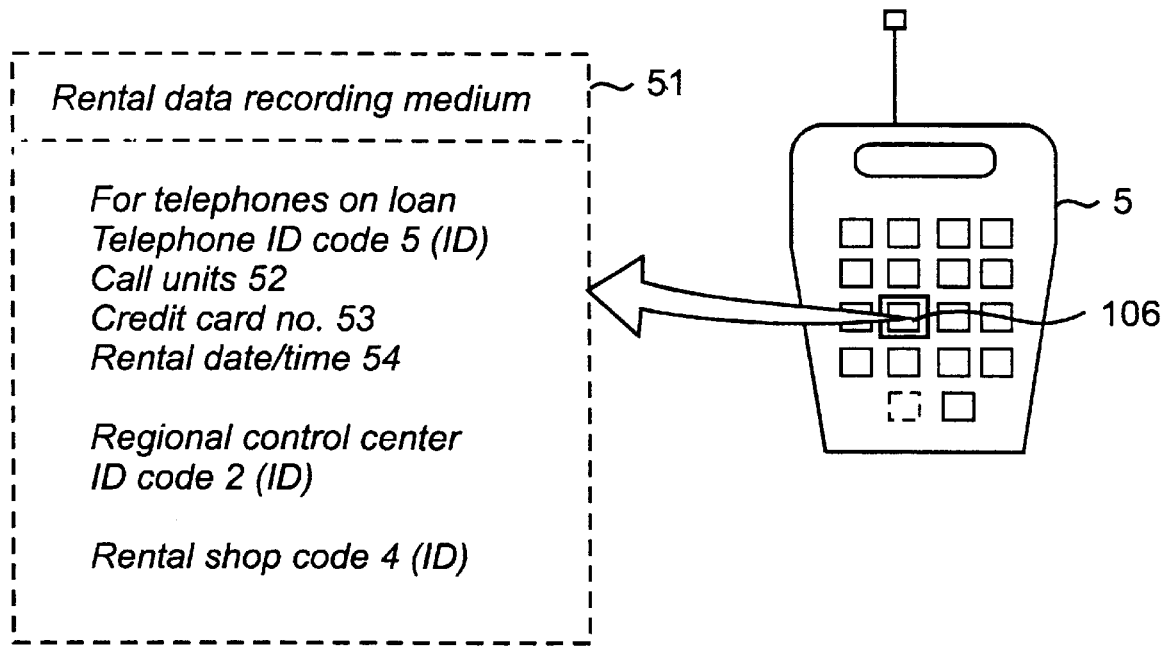
FIG. 5 is a diagram for explaining data stored in a portable telephone.

As shown in FIG. 5, the aforementioned rental data memory section 107 of the RAM 106 of the portable telephone 5 in this embodiment stores the ID code 5(ID) of the portable telephone 5, the number of call units 52, the customers credit card number 53, the rental date and time 54 and the ID code 4(ID) of the jurisdictive regional control center. Like portable telephones sold outright, it also has the call unit circuit 110 for calculating the accrued number of call units. In addition, it is equipped with the read/write terminal 5i that can be used for reading and updating the data stored in the rental data memory section 107.

The operation of this embodiment of the system for renting portable communication devices at the time of renting and returning a portable telephone 5 will now be explained.

Figure 6:
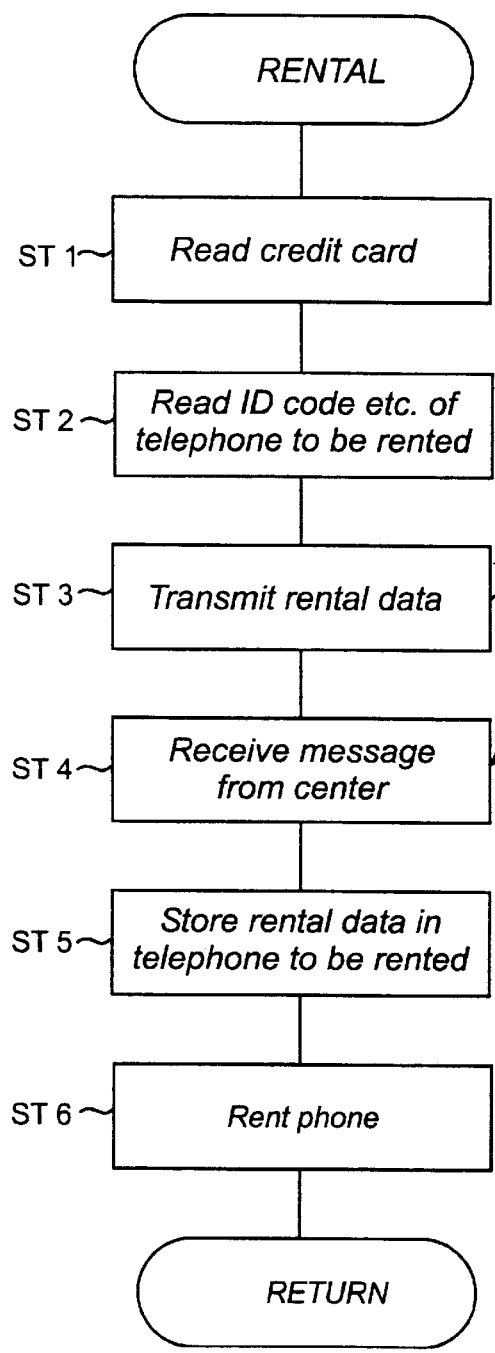
FIG. 6 is (a) (b) a set of flowcharts summarizing the operation of the rental service of FIG. 3, in which (a) is a flowchart summarizing the rental procedures and (b) is a flowchart summarizing the return procedures.
Figure 6:
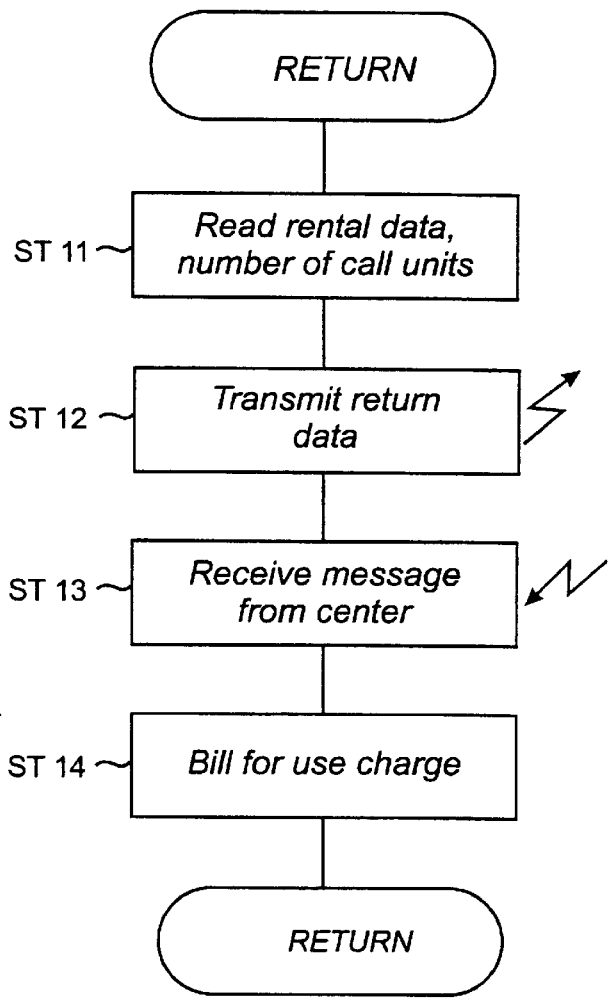

The case where a customer rents a portable telephone 5 (5-1, 5-2 . . . ) from the rental shop 4-1 will first be explained with reference to FIG. 6(a). To begin with, the card reader 46 is used to read data from the credit card presented by the customer (step ST1). The ID code 5(ID) and the number of call units of the portable telephone 5 to be rented (number of call units at rental 52) are then read from the telephone using the read sections 44, 45 (ST2). After reading, the credit card number 53, portable telephone ID code 5(ID), the number of call units at rental 52, the rental shop ID code 4-1(ID) and the rental date and time 54 are transmitted to the jurisdictive regional control center 2 (step ST3). These transmitted data collectively constitute rental data 10.

The ID code 5(ID) of the rented portable telephone is deleted from the memory section 42 for storing the ID codes of the portable telephones available for rental. The data rewrite section 47 is used to update the rental data memory section 107 of the portable telephone 5. Specifically, the rental data transmitted to the regional control center 2 is stored therein and the ID code 2(ID) of the regional control center 2 is also stored in the memory area 107 (step ST5). The portable telephone 5 is then rented to the customer at the rental shop 4-1 (step ST6). As a result, the rental data memory section 107 of the rented portable telephone 5 contains the data shown in FIG. 5.

At the regional control center 2, the received rental data is stored in the memory section 23 and the ID code of the rented portable telephone is deleted from the memory section 22 for storing the ID codes of the portable telephones 5 available in the region for rental. The regional control center 2 further sends the rental shop 4-1 a message acknowledging receipt of the rental data. This message is received by the rental shop 4-1 (step ST4).

The operation of the system at the time of accepting return of a portable telephone will now be explained with reference to FIG. 6(b) on the assumption that the portable telephone user (the customer) returns the rented portable telephone to a different rental shop from the one where it was rented (to rental shop 4-2, for example). At the rental shop 4-2, the read/write terminal 5i of the returned portable telephone 5 is used for reading the rental data 10 stored in the memory section 107 and the total number of call units accrued up by the call unit circuit 110 (step ST11). The read-out rental data 10, number of call units at return 52A, return date and time 54A and ID code 4-2(ID) of the rental shop 4-2 which accepted the return are transmitted from the transmit-receive section 48 to the regional control center 2 via a general communication line 3 (step ST12). These transmitted data collectively constitute return data 20.

At the regional control center 2, the following processing is conducted based on the received return data 20. A check is first made as to whether the regional control center ID code is that of the regional control center 2 concerned. Since in this case it is, the rental shop ID code and the portable telephone ID code are used to fetch the rental data for the portable telephone that were received and stored in memory at the time of rental and the these data are then compared with the return data. The actual number of call units accountable to the user is calculated from the call units at rental 52 and the number of call units at return 52A and the use charge is calculated from the result. Further, the ID code of the returned portable telephone is added to the list of ID codes of the portable telephones available for rental stored in the memory section 22. The data stored in the memory section 24 for storing the sales data of the individual rental shops is then updated by entering the calculated number of call units and/or use charge. The data stored in the memory section 25 for storing the sales data for the individual telephones is similarly updated.

After this processing has been completed, the regional control center 2 uses its transmit-receive section to send to the rental shop 4-2 via a general communication line 3 a message including an acknowledgement of receipt of the return data along with data relating to the number of call units and/or use charge. This message is received by the rental shop 4-2 (step ST13).

Alternatively, the rental shop which accepted the return can calculate the number of call units and the use charge based on the rental data and transmit the results of the calculation to the regional control center.

Based on the received number of call units and/or use charge, the rental shop 4-2 bills for the portable telephone use charge (step ST14). It also uses the data rewrite section 47 to rewrite the contents of the rental data memory section 107 of the returned portable telephone through the read/write terminal 5i thereof. More specifically, it rewrites the rental shop ID code 4-1(ID) stored therein to the ID code 4-2(ID) of the rental shop 4-2. It also adds the ID code of the returned portable telephone to the list of ID codes of the telephones available for rental stored in the memory section 42.

The rental and return of portable telephones is processed between different rental shops 4-1, 4-2 in the foregoing manner. The regional control center can constantly track the circulation of the individual portable telephones among the rental shops based on the telephone ID codes and the rental shop ID codes stored in their memories. The regional control center also calculates a breakdown of the sales of the individual rental shops. Periodically, for example, once a day, the data stored in memory at the regional control center are sent from the center's transmit-receive section via a general communication line to the head control center 1, where it is kept on record.

In the foregoing embodiment, charge billing and customer identification are conducted using credit cards. Instead, payments can accepted in cash and driver's licenses or the like be used for personal identification. As in the case of ordinary rental systems, it is also possible to employ a member system and issue member cards to registered members for use as personal identification.

Since the rental data is on record at the regional control center 2, it is not absolutely necessary for it to be stored in the memory section 51. In other words, a portable telephone and its user can be identified and billing for the use charges can be efficiently processed at the time of return so long as the memory section 51 stores the telephone ID code and the ID code of the rental shop from which it was rented.

When a portable telephone rented from a rental shop under the jurisdiction of one regional control center is returned to a rental shop under the jurisdiction of a different regional control center, the regional control center where the rental data for the portable telephone is on record can be identified from the regional control center ID code 2(ID) stored in the portable telephone. Therefore, if the regional control center having jurisdiction over the rental shop 4 which accepted the return of the portable telephone 5 receives the pertinent data from the rental shop 4 and then requests and receives the rental data from the regional control center where it is stored, it can conduct the processing required for use charge billing and return. The other operations in this case are the same as those in the case of portable telephone rental and return between rental shops under the jurisdiction of the same regional control center.

While the foregoing explanation was taking a portable telephone as an example of a portable communication device, the invention can be similarly applied to other types of portable communication devices.

In the foregoing embodiment, the rental-type portable telephone 5 has a single terminal 5i for reading and rewriting information stored in an internal RAM or the like. It is instead possible to separately provide a dedicated read terminal and a dedicated write terminal.

While the foregoing embodiment is configured to display the telephone number of the portable telephone on the liquid crystal display 5c when the display key 501 of the key pad 5d is pressed, this is not limitative and instead of such a visual display it is possible to provide a voice memory, record the telephone number in the voice memory and cause the recorded telephone number to be played back through the receiver 103 when a specified key is pressed.

As explained in the foregoing, this invention enables portable communication device rental and return operations at multiple rental shops which rent out and accept return of portable communication devices to be administered at a control center via communication lines. Moreover, it utilizes the identification code and call unit recording means provided in commonly used portable communication devices and assigns each rental shop an identification code by which it can be distinguished. It also enables each portable communication device to rewritably store a rental shop identification code. When the method of this invention is adopted, therefore, the rental shop identification codes, the portable communication device identification codes and the numbers of call units of the portable communication devices enable tracking of the individual portable telephones circulating among the rental shops, facilitate calculation of a breakdown of sales at the individual rental shops, and make it possible to ascertain the number of portable communication device available for rental at each rental shop and the number of portable communication device out on loan. The invention thus simplifies the processing for rental and return of portable communication device among multiple rental shops and enables the calculation and breakdown of rental shop sales to be conducted easily and with high efficiency.

Moreover, the rental-type portable telephone according to the invention simplifies the structuring of a rental system enabling rental and return of portable telephones among multiple rental shops and, in addition, enhances the ease and efficiency of tracking the circulation of the portable telephones among the rental shops, ascertaining the number of portable telephones available for rental at the individual rental shops and calculating and breaking down the sales of the individual rental shops.

What is claimed is:

1. A method of renting portable communication devices which utilizes multiple rental shops for renting out and accepting return of portable communication devices, at least one control center connected with the individual rental shops via communication lines, and rental portable communication devices each assigned an identification code and provided with a call unit recording means for recording a number of call units, and which enables a portable communication device rented at one rental shop to be returned after use to the same or any other rental shop, the method comprising the steps of:

assigning each rental shop an identification code and equipping each portable communication device with a rewritable memory means for storing at least the identification code of a rental shop, concurrently with renting a portable communication device at a first rental shop among the rental shops, transmitting to the control center as rental data the identification code of the rented portable communication device, the identification code of the rental shop and the number of call units recorded in the call unit recording means of the rented portable communication device at time of rental, storing the rental data received from the first rental shop in a rental data memory means at the control center, concurrently with accepting return of the rented portable communication device at a second rental shop among the rental shops including the first rental shop, reading as return data the identification code of the portable communication device, the identification code of the first rental shop stored in the rewritable memory means thereof and the number of call units recorded in the call unit recording means thereof and transmitting the return data to the control center, generating sales data related to use charge at the control center based on the return data received from the second rental shop and the rental data received from the first rental shop and stored in the rental memory means, storing the sales data in a sales data memory means for storing first rental shop sales data and transmitting the sales data to the second rental shop, and at the second rental shop, billing for the use charge based on the data related to use charge received from the control center and rewriting the identification code of the first rental shop stored in the returned portable communication device to the identification code of the second rental shop.

2. A method of renting portable communication devices according to claim 1, further comprising a head control center, the at least one control center being multiple control centers connected to the head control center by communication lines, each of the multiple control centers administering a different group of rental shops, each of the multiple control centers being assigned an identification code, and the portable communication device rental data and return data including a control center identification code.

3. A method of renting portable communication devices according to claim 2, wherein the portable communication device is a portable telephone.

4. A method of renting portable communication devices according to claim 3, wherein the portable telephone comprises a call unit recording means for recording a number of call units, a telephone identification code memory section for storing a telephone identification code assigned to the portable telephone, a rental shop identification code memory section for rewritably storing a rental shop identification code assigned in advance to the rental shop which rented the portable telephone, a telephone identification read terminal for reading the rental shop identification code, and a rental shop identification code read/write terminal for reading and writing the rental shop identification code.

5. A method of renting portable communication devices according to claim 4, wherein the telephone identification code read terminal and the rental shop identification code read/write terminal are installed at a location near a battery recharge plug socket located on the bottom end of the portable telephone.

6. A method of renting portable communication devices according to claim 5, wherein the telephone identification code read terminal and the rental shop identification code read/write terminal are a common terminal.

7. A method of renting portable communication devices according to claim 4, wherein the portable telephone has telephone number indication means for indicating the telephone number of the portable telephone.

8. A method of renting portable communication devices according to claim 7, wherein the telephone number indication means is a visual indication means indicating the telephone number.

9. A method of renting portable communication devices according to claim 7, wherein the telephone number indication means includes a voice memory and is a voice indicating means which can replay the telephone number.

10. A method of renting portable communication devices according to claim 4, wherein the portable telephone comprises a user memory in which a user can store abbreviated dialing numbers and the like and a clear key for clearing the content of the user memory by a single operation.

* * * * *